US009767327B2

(12) United States Patent
Küng et al.

(10) Patent No.: US 9,767,327 B2
(45) Date of Patent: Sep. 19, 2017

(54) RFID NETWORK AND METHOD FOR OPERATING THE RFID NETWORK

(75) Inventors: Roland Küng, Wolfhausen (CH); Gerhard Gangl, Tieschen (AT)

(73) Assignee: INTERMEC IP CORP., Lynnwood, WA (US)

( * ) Notice: Subject to any disclaimer, the term of this patent is extended or adjusted under 35 U.S.C. 154(b) by 1229 days.

(21) Appl. No.: 12/741,809

(22) PCT Filed: Dec. 11, 2007
(Under 37 CFR 1.47)

(86) PCT No.: PCT/CH2007/000624
§ 371 (c)(1),
(2), (4) Date: Aug. 13, 2010

(87) PCT Pub. No.: WO2009/059436
PCT Pub. Date: May 14, 2009

(65) Prior Publication Data
US 2011/0025474 A1 Feb. 3, 2011

(30) Foreign Application Priority Data
Nov. 6, 2007 (CH) .................................... 1731/07

(51) Int. Cl.
*H04Q 5/22* (2006.01)
*G06K 7/00* (2006.01)

(52) U.S. Cl.
CPC .................. *G06K 7/0008* (2013.01)

(58) Field of Classification Search
CPC ..... G06K 7/008; G06K 19/0723; G06K 17/00
(Continued)

(56) References Cited

U.S. PATENT DOCUMENTS

| 7,398,932 B2* | 7/2008 | Ashili et al. ................ 235/492 |
| 7,567,197 B2* | 7/2009 | Lee ................ H03K 3/356139 327/75 |

(Continued)

FOREIGN PATENT DOCUMENTS

| EP | 1672592 A2 | 6/2006 |
| EP | 1719067 A1 | 11/2006 |

(Continued)

OTHER PUBLICATIONS

International Search Report for International Application No. PCT/CH2007/000624, Applicant: Elektrobit Wireless Communications Ltd., mailed Apr. 23, 2008, 6 pages.

(Continued)

*Primary Examiner* — George Bugg
*Assistant Examiner* — Anthony D Afrifa-Kyei
(74) *Attorney, Agent, or Firm* — Oliff PLC; R. Brian Drozd

(57) ABSTRACT

An RFID network, comprising a plurality of RFID read/write devices, which are connected to a central controller via a communication network, has problems as the network size increases. The mutual interference potential on the air interfaces increases, high demands are placed on the communication network with respect to availability, and the efficiency of the controller per RFID write/read device decreases. If part of the resources and the intelligence of the controller are distributed to, or forwarded to, an RFID system unit comprising the RFID read/write device, some of the load is removed from the controller. The RFID system units are notified of the operating sequences to be performed via a mission and said sequences are performed largely synchronously so that the interference potential decreases. Due to the distributed intelligence, the demand with respect to the availability of the communication network likewise (Continued)

decreases and the central controller can provide more resources for processing applications. The RFID network is therefore easier scalable in size and more reliable in operation.

22 Claims, 6 Drawing Sheets

(58) Field of Classification Search
USPC .............................................. 340/10.1–10.52
See application file for complete search history.

(56) References Cited

U.S. PATENT DOCUMENTS

| | | | |
|---|---|---|---|
| 2005/0088284 A1 | 4/2005 | Zai et al. | |
| 2006/0022801 A1* | 2/2006 | Husak | G06K 7/0008 340/10.5 |
| 2006/0279406 A1* | 12/2006 | Stewart | G06K 7/10356 340/10.1 |
| 2007/0001813 A1 | 1/2007 | Maguire et al. | |
| 2007/0046467 A1* | 3/2007 | Chakraborty | G06K 7/0008 340/572.1 |
| 2007/0188328 A1* | 8/2007 | Mochizuki | G06K 7/0008 340/572.7 |

FOREIGN PATENT DOCUMENTS

| | | |
|---|---|---|
| EP | 1762960 A2 | 3/2007 |
| WO | WO-2007078440 A2 | 7/2007 |

OTHER PUBLICATIONS

Kueng, Roland "RFID Journal Live Europe 2007—The Path to Scalable Performance in RFID Networks—From ETSI regulations to EB Identification Network," RFID Journal, Amsterdam, The Netherlands,http://www.rfidjournalevents.com/liveeurope2007/pdfs_np/Nov8_11-50_SupplyChain_KuengRoland_Elektrobit.pdf, Nov. 8, 2007, 26 pages.

English Translation of International Preliminary Report on Patentability for International Application No. PCT/CH2007/000624; Applicant: Elektrobit Wireless Communications Ltd.; Mailed Jun. 1, 2010; 10 pages.

* cited by examiner 20,
21

| | |
|---|---|
| • Frequency channels | CH: 4, 7, 10, 13 |
| • Antenna switching | 1-3-2-4 |
| • Antenna dwell time | 0.25 seconds, fixed |
| • Performance attenuation | 3 db |
| • Time slot schedule | Off: n=7@Ch 4, n=32@Ch 7 |
| • Data rate | 80 kilobits per second |
| • Reception filter | 600 kHz analog, 60 kHz digital |
| • trigger events: | external on |
| • response channel | 213 kHz |
| • LBT response channel | on, threshold: -60 dBm |
| • ……. | |

| | |
|---|---|
| • data mask: | ID-range 1243xxxxx |
| • data filter: | duplicate, 10 seconds |
| • antenna dwell time | 0.25 seconds, fixed |
| • buffer: | 24 hours |
| • log: | time, antenna, RSSI |
| • User Data Read: | off |
| • … | off |

*FIG. 5*

| | | | | | | | |
|---|---|---|---|---|---|---|---|
| \|←────────────────────────── 51 ──────────────────────────→\| | | | | | | | |
| TXR1A1CH1 | TXR1A2CH1 | TXR1A3CH1 | TXR1A4CH1 | RSSI slot 5 | RSSI slot 6 | ⋯ | RSSI slot 32 |
| RSSI slot 1 | RSSI slot 2 | RSSI slot 3 | RSSI slot 4 | TXR2A1CH1 | TXR2A2CH1 | ⋯ | RSSI slot 32 |
| RSSI slot 1 | RSSI slot 2 | RSSI slot 3 | RSSI slot 4 | RSSI slot 5 | RSSI slot 6 | ⋯ | RSSI slot 32 |

RFID NETWORK AND METHOD FOR OPERATING THE RFID NETWORK

CROSS-REFERENCE TO RELATED APPLICATION(S)

This application is a national phase application of PCT application number CH2007/000624, which claims priority to Swiss application number 1731/07, filed Nov. 6, 2007, both of which are entirely incorporated by reference.

BACKGROUND

RFID read-write devices (reader devices for short), known to one skilled in the art under the term dense reader environment, are increasingly being used in large numbers in confined spaces, and they control production and product flows. Reader devices are networked to a control processor (controller for short), primarily via LAN connections, and more rarely via WLAN ones. The controller, also designated as an edgeware controller, is the connecting point to the applications which run on the computer of an operator (also designated as middleware software), with these computers representing queried data contents. The controller has three main tasks to carry out, first governing and controlling the number of reader devices, secondly translation of high-level tasks of middleware into instructions to the reader devices for querying the data contents of electronic labels (labels for short) and third, further processing of data contents of the labels of numerous reader devices to obtain the desired information for the middleware. Critical points in this regard are, for example, the mutual interferences of the reader devices, which operate with large sending capacity, the large numbers of data packets that run via the communication network to the controller and the loading of the communication network by other processes of the operator. Various methods have been proposed to defuse one or another of these problems.

Thus, US 2006 0279406 proposes a synchronization of reader devices, conducted by a master station, which delivers a time signal on a separately wired synchronization bus; true, it has high availability, but involves additional expense for hardware and cables for it.

US 2007 0001813 uses a central controller for synchronization of reader devices, thus eliminating the additional timing line. The controller forms groups of reader devices which are not mutually interfering and then works according to a temporal sequence, a schedule. These measures are also known to one skilled in the art as SDMA and TDMA. This method, like others, is suited to produce a static synchronization of the reader devices, but entails high availability of the communication network, because the schedule is filed in the controller.

A proposal is made in US 2005 0088284 that an interference list be kept in readiness in each reader device, with this interference list being able to prevent a simultaneous, interfering operation of neighboring reader devices. Via a signalization on the network, active reader devices communicate the start and end of a sending phase to the neighboring reader device. They thus permit a form of listen before talk technique, so that owing to decisions in each reader device, interferences also can be avoided.

EP 1762960 depicts a process for operating multiple reader devices in which various communication protocols can be used, such as differing modulation, frequency, coding, data rate, so that no interferences occur. On the other hand, for this in each reader device a schedule is stored in a storage device. The synchronization is effected either via a master or via a coordinator having an activity monitor. The reader devices can communicate among themselves by means of an activity signal to prevent interferences. The proposed solution is primarily aimed at applications with two different protocols, such as near field communication (NFC) or a contactless smart card, which both, for example, can be found in a cell phone or a PDA, and would interfere with each other.

In WO 2007 078440, a certain degree of intelligence for optimizing an RFID network (not to be confused with an LAN network between the controller and the reader device) is put into a reader device. The RFID network is designed without a controller and designs itself, according to a known art, the so-called ad hoc networks, in the area of the wireless sensor net. Instead of the controller, a primary and multiple secondary reader devices are included, with the primary reading devices assuming part of the tasks of the controller. The performance capability of a primary reading device cannot in any case be equal that of a controller, and therefore in large networks, it soon reaches its limits. Here limits are set primarily by large RFID networks such as availability, redundancy, error tolerance and load compensation. A storage block with RFID network rules prevents mutual interferences in that the primary reader device governs the frequency and time-slot resources as network rules, and gives assignments to the secondary reader devices. Additionally, an optimization module is available which can statistically and logically process data of the electronic labels and include planned processing of other stations into the activity, which primarily is helpful with processing of an electronic label by multiple stations. The stations organize themselves, especially in a version that even does away with a primary reading device. This method has a drawback in that convergence and stable operation cannot readily be assured and are not able to be much influenced, since the RFID network behaves very dynamically and, as recorded in WO 2007 078440, similar to a neural net. Reader devices can also communicate with each other via the same antenna as for the processing of the electronic labels.

An additional communication option via the air interface with synchronization of reader devices and a procedure based thereupon is carried out in EP 1719067 by means of the so-called reader service signals.

US 2007 0046467 shows a network which connects reader devices in a chain to a controller (there designated as a server). The first reader device communicates with the server and a second reader device, which in turn is in connection with a further reader device. To have available a time signal for a synchronization of the read-write cycles in each reader device, they periodically obtain the time from a so-called network time protocol (NTP) server or from a clock in a first reader device, which is attached to the server.

EP 1672592 clearly depicts the task of a controller for scalable, large RFID networks. In particular, examples of data processing of read-out labels are implemented. Virtually the entire task is given to the controller of governing the reader devices and processing data. Via a user-user interface, application programs—also designated as a configuration— for processing of labels are entered into the controller (middleware interface). Using the data read by the selected reader devices, the processing then correspondingly occurs in the controller. The controller individually governs every action of the reader devices, such as antenna selection.

What is common in the noted prior art is that an RFID network with large and increasing numbers of reader devices to be governed and a growing number of labels to be read comes into contact with processing limits and thus the readout rate is limited by the availability of the communication network and/or by the also concomitant interferences on the air interface. The communication network is often part of the infrastructure of a user, and a great variety of processes run on it. The result of this is that a communication network between the reader device and controller connecting it is not available for this reader device, or that such a communication network has too little capacity to send all of the data read from labels to the controller in timely fashion. It should be mentioned at this point that upon being queried, each label for the most part is detected multiple times, as long as it is in the field of one or more reader devices. Simple, i.e., uncoordinated, transfer of all this data by conventional, unintelligent reader devices generally does not make sense, least of all in large RFID networks.

SUMMARY

Therefore it is the task of the present system for an RFID network to develop it further to the effect that labels can be read out as quickly and faultlessly as possible by reader devices. Additionally it is the task of the present system for a procedure to operate an RFID network, to develop it further to the effect that labels can be processed as quickly and without distortion as possible in a comprehensive RFID network.

A solution of the problem that is the basis for an RFID network is indicated in claim 1. Features that further develop this concept are the subject of subordinate claims 2 and 3.

The system-specific RFID network has RFID read-write devices (hereinafter reader devices for short), each of which form an RFID system unit having a mission message reception device and a first network interface, with a central controller in the RFID network comprising a mission message transmission device and a second network interface, and with the second network interface of the controller being connected via a communication network with the first network interface of all RFID system units. A core of the system is to be seen in that owing to a dispatch of an individual mission from the mission sending device of the controller to each mission reception device of an RFID system unit, it then operates independently for an operational interval, with the received mission including all necessary instructions in regard to starting time of the mission, sequence to selecting antennas or frequency channels and the processing of labels and their data contents. Of especial advantage is that the tasks are carried out by the controller and reader devices in distributed fashion, so that a communication network that links the reader devices, which links the at least one controller with a number of reader devices, is not heavily loaded and the individual reader devices can independently carry out their task for a certain time.

Additionally it is advantageous that the reader devices operate in synchronized fashion to a time signal, but they independently determine their frequency channel and time slot for querying a number of electronic labels without generating interferences. In addition, the system operates adaptively and allows the reader devices to transmit mutual parameters for influencing the implementation instructions. In addition, the system is suited to organized, adaptive processing of labels, with passive sensors also to be understood thereby, which use the same radio procedure.

In contrast to the prior art, the controller alone is not responsible for each detailed control instruction, nor is the RFID network designed to be dynamically self-configuring.

Advantageously, the mission reception device comprises a parameter implementation device, an instruction device and a time synchronization unit, each of which communicate with a corresponding control parameter generator, an instruction generator and a time synchronization generator of the mission sending device of the controller.

With the system-specific procedure for operating an RFID network, comprising a number of RFID read-write devices for processing electronic labels, and a central controller which is connected to a user computer, an RFID read-write device which forms an RFID system unit with a mission reception device and a first network interface communicates by means of this RFID system unit via a communication network with the central controller, which itself has a second network interface and a mission sending device.

Each mission reception device of an RFID system unit communicates by means of a parameter implementation device with a control parameter generator of the mission sending device in the controller. Additionally, an instruction device of the mission reception device communicates with an instruction generator of the mission sending device, and a time synchronization unit of the mission reception device communicates with a time synchronization generator of the mission sending device.

According to the present system, prior to an operating interval of the reader device, a mission is distributed by the controller to each RFID system unit, including a number of control parameters and/or a number of instructions and/or programs and/or a number of time indications. Each mission is then merely transmitted by means of time hacks periodically distributed by the controller to the RFID system units independently within a period of time consisting of one or more operating intervals, to process a number of electronic labels. A core of the present system is to be seen in that owing to a dispatch of an individual mission from the mission sending device of the controller to each mission reception device of an RFID system unit, it then operates independently for an operational interval, with the received mission including all necessary instructions in regard to starting time of the mission, sequence to selecting antennas or frequency channels and the processing of labels and their data contents. Of especial advantage is that the tasks are carried out by the controller and reader devices in distributed fashion, so that a communication network that links the reader devices, which links the at least one controller with a number of reader devices, is not heavily loaded and the individual reader devices can independently carry out their task for a certain time.

The RFID system units participate intelligently in application programs of a unit; they themselves take care to ensure interference-free operation and are adaptively adjusted by the controller to changing situations and tasks, without the RFID system units attaining complete independence. The user interface—always remaining the same for each structure of the communication network—should guide via a controller, which does not preclude multiple controllers from participating for the purpose of availability and redundancy. Owing to this design, the network is easy to scale in size.

The RFID system units possess resources which ensure a sufficient intelligence (processor performance, storage) to carry out components of the controller's tasks. The procedure for controlling an adaptive operation of the communication is solved here for the first time with the present system.

A mission message or mission—in its meaning as per the present system—is a collection of adjustment parameters, lists of parameters with degrees of freedom, schedule dates and instructions which make possible partial programs for processing data of the labels in the RFID system units, including time hacks for the start of implementation and its duration. Missions are transmitted by the controller during an available phase of the communication network to the RFID system units, stored by them and confirmed. Each RFID system unit can receive and work through one other or multiple missions. Each RFID system unit possesses corresponding program parts to decode and carry out the mission. Through the missions, the RFID system units are independent during their duration, especially if the communication network fails. The missions also contain the tasks for a reduction of data read from labels and information for a reduction of multiple readings, as long as a single RFID system unit can grasp this, i.e. those related to labels read by it. Such pre-processing can, for example, include data filtering, accumulation, searches, correlation and intermediate storage. By the fact that these and if necessary additional tasks are accomplished in the RFID system units, the network and the controller are relieved of burdens. Then in advantageous fashion the controller takes care only of that processing which the data from labels need as an input, that are detected by various RFID system units.

The controller takes care of time synchronization of RFID system units, by periodically sending the system time as a time hack to all RFID system units (such as broadcast). The RFID system units set their own clocks to these time hacks, with the internal time indicator having sufficient stability to independently remain synchronous for a sufficiently long time even if there is a long interruption. Typically the time tolerance in an RFID system unit is 10 ppm, thus 1 millisecond per 100 seconds.

An additional advantageous embodiment of the present system makes provision that the time synchronization is not controlled by the controller, but rather by a selected RFID system unit which the controller determined at the time of placement in operation. Synchronization markers can also be transmitted via the air interface. These methods can also go into action as a backup function if the communication network undergoes a lengthy failure.

To prevent interferences and disturbances by neighboring active RFID system units, in a further embodiment of the present system, the controller sends a special mission to all RFID system units which puts the RFID system units in a condition to determine the potential of interferences. For this, in a known manner, each RFID system unit is induced at a preset time and for a preset duration to make a one-time dispatch of a carrier signal, while the other RFID system units measure the received signal strength and store it with the time interval. After all combinations have been run through, the interference potential is stored in each RFID system unit. According to the instruction in the mission, these data are sent at a preset time to the controller. From them, the controller computes an operational running plan (also called a schedule) for the RFID system units, which guarantees interference-free operation. For this, frequency channels and time slots are available to it, as well as selection of the antennas which are attached to an RFID system unit. The compiled schedules are then again transmitted to the RFID system units. From then on, every RFID system unit knows which frequency channels it can use, and when. Temporary changes in these schedules can be a part of each following mission.

Such a need for changes can arise for many reasons. On the one hand, the priority in processing labels can shift, so that some RFID system units require more resources than others, and thus the schedule is altered selectively by the controller.

But also a mobile RFID system unit, for example, can get registered in the network and requests resources from the controller. Thereupon the controller will also temporarily package new details for the schedule and send it to the correspondingly affected RFID system units.

In an additional system-specific embodiment form, the RFID system units report an increase in interference, which permits one to conclude there is a large change in the environment, entailing propagation conditions for the radio signals or outside-the-system sending devices in the vicinity. Thereupon the controller can in turn send a mission to detect the interference potentials to the affected RFID system units, most of them locally limited. This type of guided, adaptive operation of an RFID network is distinguished by the proposed method vis-à-vis the prior art.

As shown in this example, the entire RFID network is adaptively controlled, and yet each RFID system unit is sufficiently intelligent to operate independently according to a locally valid mission. In advantageous fashion, by this means, no permanently available communication network is presupposed. The RFID system units also can receive a sequence of missions, since each mission contains a time and duration of assignment.

In a further embodiment form, the missions contain data for interference-free operation, which determine selection of frequency channel, time slot, power and antennas. Likewise the various functions like type of modulation, data rates, receiving filter adjustments, decision thresholds, and so forth, can be included, so that for each task, the optimal operating parameters can be set for each RFID system unit.

In a further embodiment form, instead of only one parameter per function, a list of permitted parameters can also be defined; within this list, the RFID system unit may make a suitable selection with the aid of its intelligence and the results from its own signal processing. An example of such a list is the sequence of frequency channels that are to be used for countries and regions, which prescribe so-called frequency hopping of the carrier signal. Together with the synchronous operation, a pseudo-random frequency hopping is possible, which entirely prohibits collisions on the air interface.

In a further embodiment form, missions contain partial programs or parameters for already programmed routines which are needed for data processing in the RFID system unit, such as filtering of read label data, reading of certain data fields on the labels, and searches for specific label identifications.

It is pointed out that the term electronic label used in this document also includes, along with identification data, storage areas for the application or sensors which write measurement values into a storage area. From this, as one skilled in the art knows, correspondingly further routines are derived for data processing, which are not explained here owing to familiarity.

In a further embodiment of the present system, neighboring RFID systems can be authorized to directly send parameters via the network to their neighboring RFID system unit. These parameters expand or limit the selection within a current or future mission, which is preset by the controller, so that overall the operation can be even further optimized.

BRIEF DESCRIPTION OF THE DRAWINGS

FIG. 4 is an exemplary control parameters of a mission.

FIG. 5 is an exemplary instructions for data processing of a mission.

FIG. 8 is an implementation of a mission for eliminating a disturbance situation (interference potential) plotted over a temporal axis.

FIG. 9 is a spectral representation of the channel 65 with the carrier signal 60.

DETAILED DESCRIPTION

Figure 1:
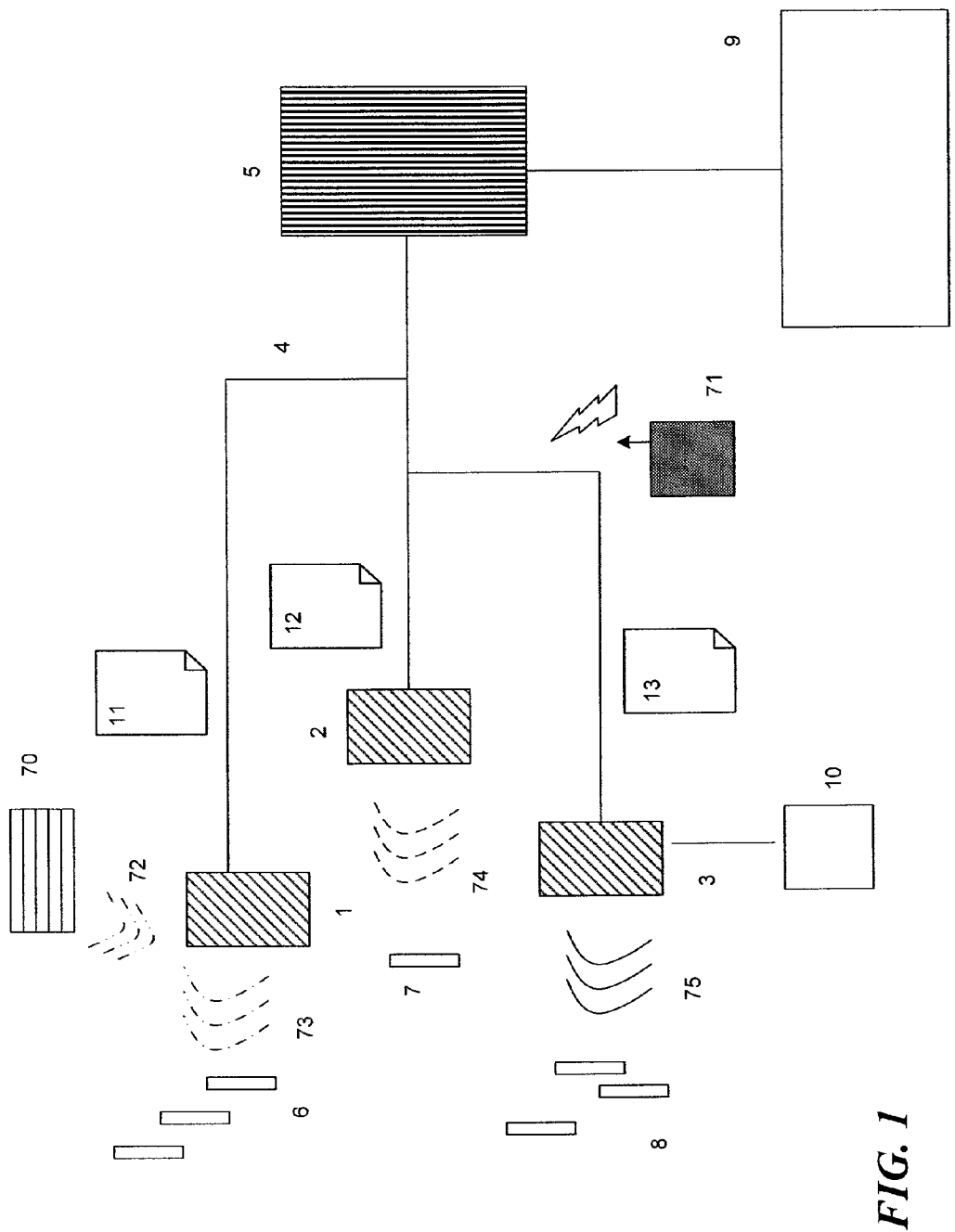
FIG. 1 is a block diagram of an system-specific RFID network, comprising a number of RFID system units, a controller and a user computer.

FIG. 1 shows a system-specific RFID network, comprising a user computer 9, a control processor (processor for short) 5, multiple RFID system units 1, 2, 3, with controller 5 and RFID system units 1, 2, 3 connected with each other via a communication network 4, and a number of electronic labels (labels for short) 6, 7, 8. Onto RFID system units 1, 2, 3 signalization elements 10 can be attached, such as photovoltaic barriers or proximity sensors, which generate a trigger signal to start the processing of labels. Other signalization elements 10, like an acoustic horn or a light signal, confirm events that have happened or issue alarm or status messages.

Figure 2:
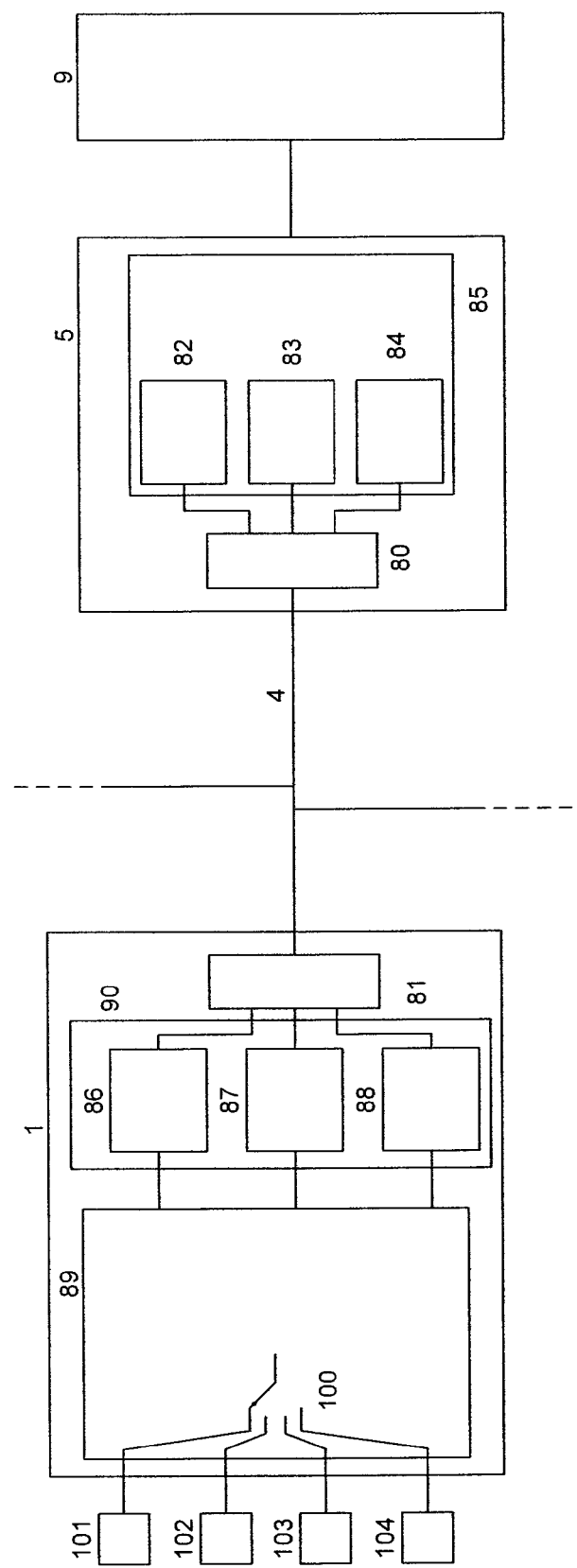
FIG. 2 is a block switching circuit diagram of an RFID system unit and a controller.

FIG. 2 clarifies the system-specific design of the RFID system units 1, 2, 3 and of controller 5. RFID system unit 1 comprises an RFID read-write device 89 (hereinafter reader device 89 for short), a mission reception device 90 and a network interface 81. The reader device 89 is connected with four individual, spatially directed antennas 101-104, which are switched via an antenna selection switch 100. Mission reception device 89 comprises a parameter implementation device 86, an instruction device 87 and a time synchronization unit 88.

The controller 5 likewise comprises a network interface 80, which is connected with the particular network interface 81 of each RFID system unit 1, 2, 3 (FIG. 1) via communication network 4. For the sake of overview, in FIG. 2 only one RFID system unit 1 is shown, with the communication network 4 being indicating by dash-lined branches that multiple RFID system units are in this communication network 4. Additionally, controller 5 comprises a control parameter generator 82, an instruction generator 83 and a time synchronization generator 84.

As will be presented in what follows, by means of missions 11, 12, 13 (FIG. 1), the parameter implementation device 86 communicates with the control parameter generator 82, the instruction device 87 with the instruction generator 83 and the time synchronization unit 88 with the time synchronization generator 84.

On the communication network 4, between controller 5 and RFID system units 1, 2, 3, message fields with very varied control dates are exchanged, defined in this place as missions 11, 12, 13, which permit operation of RFID system units 1, 2, 3 in a largely autonomous, but nonetheless controlled way and manner. By this means, communication network 4 is relieved of burdens, and high availability is not absolutely required. Missions 11, 12, 13 are configured so that each RFID system unit possesses all the information to carry out tasks set by user computer 9. This presupposes a sufficiently intelligent RFID system unit 1, 2, 3. The controller 5 has the task of compiling the necessary missions 11, 12, 13 from the instruction of user computer 9 and sending them to RFID system units 1, 2, 3. In addition, controller 5 collects the informational data (data contents) of read labels 6, 7, 8 or groups of labels of all RFID system units 1, 2, 3 via communication network 4 and unifies them into an event or a reply to the attention of user computer 9. Usually, for cost reasons, one RFID system unit 1, 2, 3 sequentially serves multiple antennas 101-104, typically 4, which are not shown in FIG. 1 for the sake of overview.

In contrast to prior art, RFID system units 1, 2, 3 do not operate dynamically independently, nor does controller 5 trigger each individual action in each RFID system unit 1, 2, 3 by means of a command. Rather, it is the purpose of controller 5 to package instruction packets as flexibly as possible in missions 11, 12, 13, so that each RFID system unit 1, 2, 3 can operate in temporally ordered and task-related fashion. By this means, the availability of RFID system units 1, 2, 3 is advantageously increased for processing labels 6, 7, 8 and at the same time lessening the availability requirement of communication network 4.

Figures 6, 7:
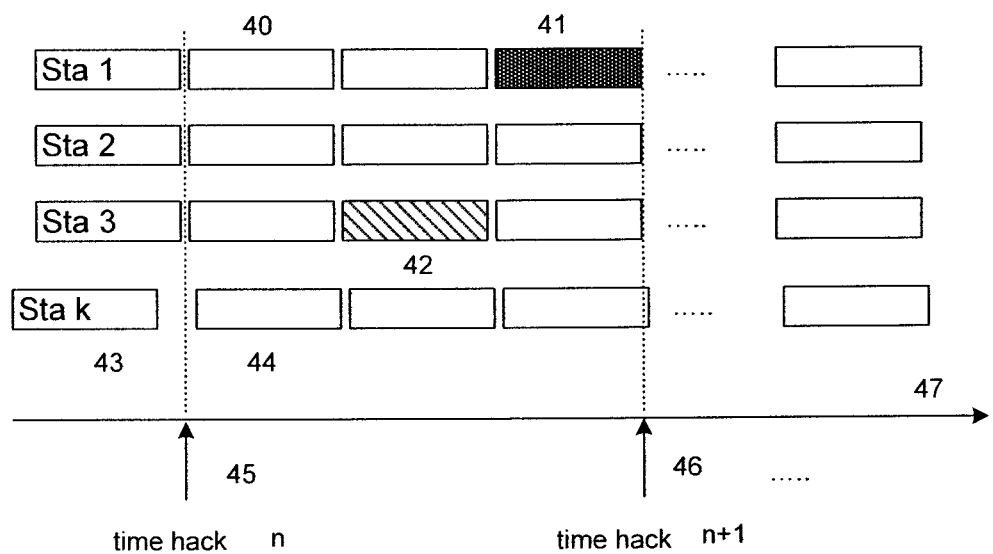
FIG. 6 is an exemplary instructions for implementation time of a mission.
FIG. 7 is a time diagram for synchronization and avoidance of interference for a frequency channel.

The proposed method makes a balanced distribution of resources, processor performance and memory volume to controller 5 and RFID system units 1, 2, 3, to permit synchronously controlled, adaptive operation even with the communication network 4 being less available. The means of making the adaptability with communication network 4 less available, is attained by the compilation and dispatch of missions 11, 12, 13 by controller 5 which permits RFID system units 1, 2, 3 to operate autonomously for a certain time within a precisely preset framework, and maintains synchronization only by time hacks 45, 46 (FIG. 6). Transmission of missions 11, 12, 13 is considerably more efficient than individual transmission of each information component, especially when communication network 4 has reduced availability. Controller 5 aids in conferring stability on the RFID network, in contrast to conventional RFID networks that organize themselves dynamically. This in turn facilitates additional tasks like redundancy, fallback, error tolerance, and load balancing at the stage of controller 5, if more than one controller 5 comes into use.

Figure 3:
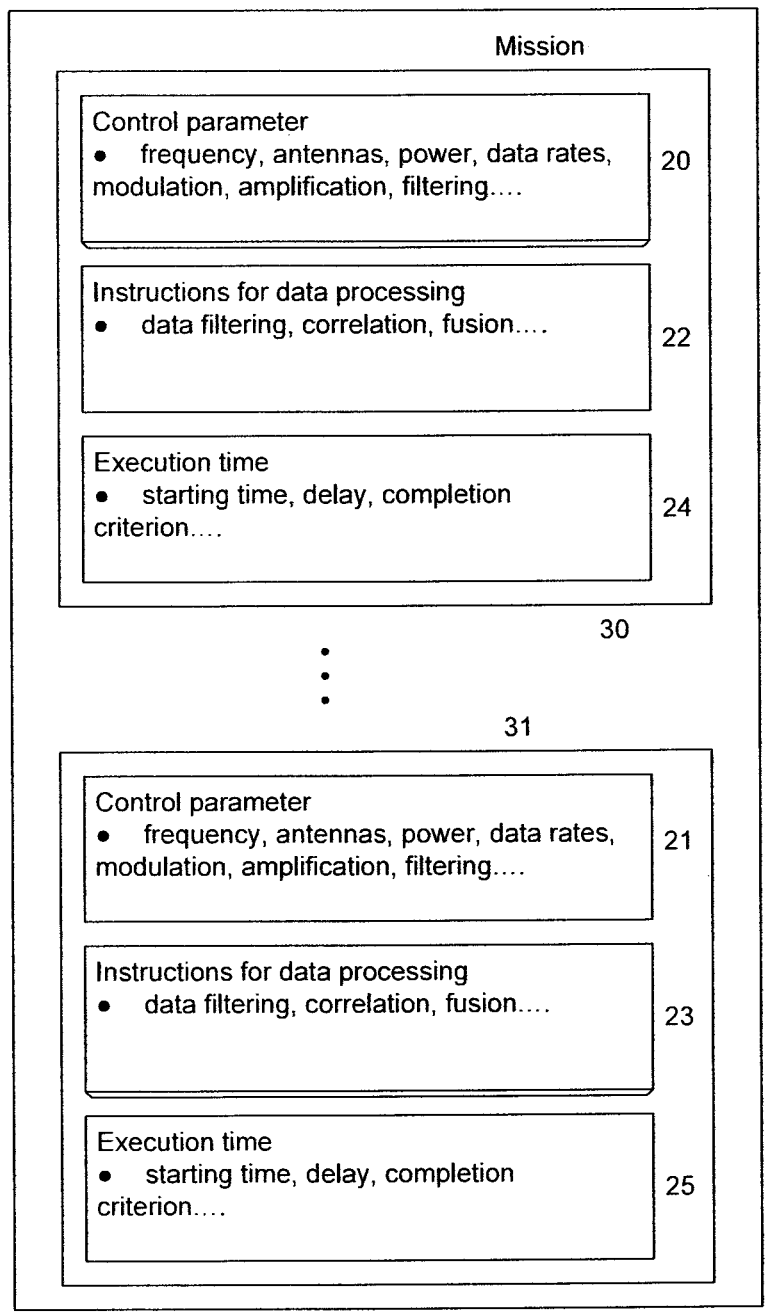
FIG. 3 is an exemplary content of a mission with multiple fields of control parameters and control lists, instructions to data processing and information on implementation time.

As an example FIG. 3 show a possible design of a mission 19, as these missions 11, 12, 13 are shown in FIG. 1. Mission 19 consists of one or more fields 20, 21, 22, 23, 24, 25, which can be combined into groups of instruction packets 30, 31, for example fields 20, 22, 24 into group 30. The fields of a group 30, 31 belong together and are each equipped with all the information for a certain assignment. Implementation examples of this look appear as follows:

A first field 20, 21 contains parameters which govern the operation of the hardware and the signal processing in RFID system unit 1, 2, 3 to the extent necessary for all RFID system units 1, 2, 3 to work together in interference-free fashion; also see FIG. 4. In contrast to prior art, it is not fixed settings that are stored in RFID system units 1, 2, 3, but rather in each mission 11, 12, 13, 19, settings are efficiently selected anew. As FIG. 4 shows by way of example, possible settings are the permitted data rates, modulations, receiving filters to be used in both the analog and digital signal processing area, released frequency channels, maximum sending power, sequence of switching antennas on, dwell time on an antenna, and handling signals of external signalization elements 10. One skilled in the art readily knows additional parameters, the settings of which can optimize the operation.

For this, as an example, mention is made of the indication of frequency channel 64, 66 in FIG. 9 for the reply 62a, 62b of labels 6, 7, 8. RFID system unit 1, 2, 3 can set this parameter with the start of the query on the label 6, 7, 8. The reply of label 6, 7, 8 is then modulated on a subcarrier so that the weak reply signal 62a, 62b comes to lie in neighboring channel 64, 66 to a strong carrier signal 60 in channel 65 of the station, as is depicted spectrally in FIG. 9. It also can make sense, to avoid unnecessary attempts to process electronic labels, to make a preliminary level measurement (LBT) in this reply channel 64, 66 and to compare with a threshold. It is just such processes which influence the processing of labels 6, 7, 8 by RFID system unit 1, 2, 3, that can be set within field 20, 21 and parameterized.

A further example from field 20, 21 is represented by the list of frequency time slots that avoid interference. We are dealing with a type of schedule which governs the exceptions, at the times of which the affected RFID system unit 1, 2, 3 cannot send on this channel, because otherwise it would interfere with another RFID system unit 1, 2, 3. As listed in the example of FIG. 4, during time slot 17, RFID system unit 2, for example, may not send on channel 4, and during time slot 32, not on channel 7. The reason is that the affected RFID system unit 2 clearly is installed close to another RFID system unit 1, 3 and it would interfere with them when receiving the reply of labels 6, 8. The controller 5 receives the data about these schedules from a special mission 11, 12, 13, 19 upon being placed in operation or by one repeated in the meantime, which detects the interference potential and occupation of channels by outside-the-system sender 71, FIG. 1. An exact explanation follows after the discussion of the remaining, non-exhaustive examples of fields 20-25.

A second field 22, 23 for the embodiment example is depicted in FIG. 5. It contains instructions or program components for data processing in RFID system unit 1, 2, 3 regarding the data which derive from labels 6, 7, 8 processed by the RFID system unit 1, 2, 3. Thus the controller 5 assigns a task to each RFID system unit 1, 2, 3, with the goal of getting more quickly and with fewer data transfers on communication network 4 to the data requested by user computer 9. Thus, for example, in practical operation, a certain label 7, which is permanently in the field of RFID system unit 2, is repeatedly read. But we have only a one-time interest in the identification number or the data content on label 2. With the instruction [duplicate, 10 seconds] in field 22, 23, the identification data are stored only once for 10 seconds and transmitted to controller 5. Similarly, using a low-pass data filter, it is prevented that a label responding only once briefly is heeded at all, since we are dealing with a label from the vicinity such as label 6. One skilled in the art knows such parameterized data processing routines, such as correlation with sought label numbers, limitation of the identification numbers to a subgroup, or intermediate storage for a certain time. The latter is important in order not to lose any data if communication network 4 is not available.

It can be useful as a special feature to store certain physical measurement values each time an RFID system unit 1, 2, 3 processes a label 6, 7, 8, such as the time, signal strength or the number of antennas 101-104 of RFID system unit 1, 2, 3 that are switched on, if, as is often the practice, it has attached multiple antennas 101-104. Such information, evaluated statistically in controller 5, makes it possible to optimize the system and monitor the quality, and can contribute to modification of missions 11, 12, 13, 19.

If as electronic labels 6, 7, 8 we also understand those that are equipped with a sensor, than a program component in field 22, 23 can in the same way be assigned to process the measured values in RFID system unit 1, 2, 3.

A third field 24, 25 is depicted in FIG. 3 and FIG. 6 as an embodiment example; it governs the start, duration and end of a mission 11, 12, 13, 19. By periodic synchronization, using the known network time protocol (NTP), for example, each RFID system unit 1, 2, 3 is supplied with the absolute time with sufficient precision. The RFID system unit 1, 2, 3, can thus determine the time from which the mission 11, 12, 13, 19 is to be carried out, with precision to milliseconds. A delay time can aid in governing certain settings over the entire communication network 4 or in the course of the mission 11, 12, 13, 19, so that no impermissible system settings arise. An interrupt criterion can end a mission 11, 12, 13, 19, if it has become logical to do so.

This description of fields 20-25 is not exhaustive. However, on the basis of these examples, one skilled in the art can define additional such fields, select different content or use other command structures, which are used according to the same principle and with the same goal.

FIG. 7 provides an embodiment example regarding synchronization. Along time axis 47, there are periodic time hacks 45, 46 which contain the absolute time or the time relative to a known fixed point. RFID system units 1, 2, 3 do not have to receive every one of these time hacks 45, 46, in order to remain sufficiently synchronous, since they themselves have available very stable time bases in their frequency synthesizers, with a typical deviation of less than plus or minus 10 ppm. If, for whatever reason, such as something new inserted into communication network 4, an RFID system unit k has become interrupted, or even if there is a mobile RFID system unit k, which has just gone into communication network 4, then its initial time slot 43 is not synchronous. With receipt of time hack 45, it is easy, however, to synchronize RFID system unit k to RFID system units 1, 2, 3. The following time slot 44 is congruent with time slot 40. Typically the duration of a time slot is in the area of 0.1 to 1 second, while the time hacks for example are issued every one to 10 seconds. But other divisions are easily implemented depending on the type of application and the dimensions, such as the number of antennas per RFID system unit 1, 2, 3 and the number of labels 6, 7, 8 to be processed.

Also depicted in the same FIG. 7 as an example is that time slot 41 of RFID system unit 1 and time slot 42 of RFID system unit 3 have been marked in black after receiving a mission. In these time slots 41, 42, the said RFID system unit may not send in this frequency channel. Such a list exists for each frequency channel, but as a rule it is limited to locationally close RFID system units 1, 2, 3, and therefore less frequent than permitted white time slots. The time hacks may alternatively be issued by an RFID system unit 1, 2, 3. This is especially advantageous with the method for time hack transmission via the air interface. The RFID system unit 1, 2, 3 that provides the time in this case acts as tasked by controller 5.

A special mission 50, see FIG. 8, is detection of the interference potential when the RFID network is placed in operation and when it is subjected to periodic or intermediate checks. This mission 50 contains a sequence of time slots and instructions to RFID system units 1, 2, 3, with the result that an RFID system unit precisely issues an unmodulated carrier signal for the duration of a time slot, while the other RFID system units 1, 2, 3, measure the level (so-called RSSI value) at the receiver, assign it to the particular time slot and store it. This is applied as an example in FIG. 8 for eight RFID system units, each with four antennas and a channel as a command sequence 51 over temporal axis 47 for RFID system unit 1, which has four antennas in the embodiment example, and for frequency channel 1.

In it, the abbreviations in the sequences are the following:
R1, R2=reader devices no. 1 and no. 2 respectively
CH1, CH2=frequency channel no. 1 and no. 2, respectively
A1, . . . , A4=antenna no. 1 to no. 4
TX=RFID system unit 1, 2, 3, sends carrier signal
Slot=time slot
RSSI=receive and measure and store with slot number Sequence 52 is valid for RFID system unit 2. At the conclusion, all RFID system units 1, 2, 3, measure without an RFID system unit 1, 2, 3 being at Send, with the intention to detect non-RFID sender 71 (see FIG. 1) and determine its level. The pertinent sequence is depicted in FIG. 8. Advantageously, this last-described measurement is carried out in frequency channels 64, 66 of replies 62a, 62b of the labels, since their signals are the most vulnerable due to non-RFID sender 71. Instead of an unmodulated carrier signal, a carrier signal modulated with random data can be used to determine the interference of an RFID system unit 1, 2, 3 in frequency channels 64, 66 of the replies of the labels. Instead of the simple RSSI measurement, a more complex analysis can be carried out by means of a fast Fourier transformation over the frequency range of interest, thus to get a more detailed spectral overview. But the amounts of data to be determined are then somewhat larger. The procedure is carried out for each frequency channel, either described as a part of mission 50 or by defining a special mission for each channel. At the end of special mission 50, all measured values are transmitted to controller 5, ordered as measured values in packets by time slot. Then the controller determines from them the schedules and the time slots not allowed per frequency channel.

To obtain an adaptive method for the RFID network, in a more comprehensive embodiment form it is advantageous if certain parameters can be directly exchanged between RFID system units 1, 2, 3. For this also, communication network 4 is used or the air interface directly, if this is already used for synchronization purposes. This medium provides missions 11, 12, 13, 19 with still more flexibility. Thus, for example, an RFID system unit 1 can provide a message to immediate neighbors 2, 3 that it has received a trigger signal about which frequency channel and which sequence of antennas it is using. If a short time later one of the neighboring units 2, 3 also receives a trigger signal, then for its part when selecting the frequency channel and the antenna sequence, it takes the obtained parameters of RFID system unit 1 into account. RFID system units 1, 2, 3 stay silent with no trigger signal when corresponding parameters are communicated.

Another example can be the determination of interference by a non-RFID sender 71 (FIG. 1) using RFID system unit 2 in a certain frequency channel. The interference information is forwarded to neighbors 1, 3, which also thereupon avoid this channel.

A third, non-exhaustive example is the transmission of the successful message of a mobile RFID system unit 70 in FIG. 1 with a fixed unit to its neighboring units. Especially if RFID system units 1, 2, 3, 70 are synchronized and communicate via air interface 72 (see reader service signal in EP 1719067), mobile RFID system unit 70 makes effort to receive a time hack 45 as the first, and to synchronize to the RFID network. When then it communicates in a time slot provided for this to the adjoining RFID system unit 1, 2, 3, for example RFID system unit 1 in FIG. 1, mobile RFID system unit 70 asks according to available frequency channel and time slots for processing of labels. As soon as RFID system unit 1 has received this query, it releases a part of its resources for the mobile RFID system unit 70. RFID system unit 1 thereupon informs mobile RFID system unit 70 and the surrounding adjoining units 2, 3 and the controller about the resources issued. Thereupon the surrounding RFID system unit 2, 3 cancels the granted frequency channel from its list in the current mission for the time slot granted. It does this because otherwise it could get an interference problem with the mobile RFID system unit 70 if it made this selection. However, the loss of resource is slight for the most part, since the surrounding RFID system units 1, 2, 3 each already have resources assigned orthogonal to each other and thus mainly the RFID system units 1, 2, 3 directly adjacent to mobile RFID system unit 70 must yield from their resources. Communication with the surrounding RFID system units 1, 2, 3 can likewise be implemented via the air interface or via communication network 4. In a case of conflict, controller 5 decides regarding adjusted missions for RFID system units 1, 2, 3. It is in this way possible to temporarily include mobile RFID system unit 70 into the RFID network, and release a part of the frequency channel and time slot resources of the surrounding fixed RFID system units 1, 2, 3, without disturbing the function of all RFID system units 1, 2, 3, and without even needing a connection to controller 5. Otherwise such a connection would have to be effected in wireless fashion to guarantee the mobility, for example via a WLAN.

The enumeration of options for use of missions and their content is not exhaustive. Other usage options for missions, other means to implement the method and other structuring of the components of a mission can easily be opened up by one skilled in the art, as soon as he has defined a specific application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein" and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while steps, processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

All patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A radio frequency identification (RFID) network system, the system comprising:
multiple RFID read-write devices for processing electronic RFID labels,
wherein the multiple RFID read-write devices each form an RFID system unit, and wherein each of RFID system unit includes:
a mission reception device configured to receive mission messages, and
a first network interface; and
a central controller comprising:
a mission sending device configured to send mission messages to each of the mission reception devices in the RFID system units; and
a second network interface coupled via a communication network with the first network interface of all of the RFID system units, and
wherein each mission message includes at least one of: adjustment parameters, a list of parameters with degrees of freedom, and a schedule of times and instructions to process data received from the RFID labels by the RFID read-write devices that form part of each of the RFID system units,
wherein each of the RFID system units operate autonomously according to instruction packets specified in its mission message, and the central controller does not directly control each individual action performed by each of the RFID system units, and
further wherein each mission message includes a start time and a duration of implementation of the mission message.

2. The RFID network system of claim 1 wherein the mission reception device comprises a parameter implementation device, an instruction device and a time synchronization unit.

3. The RFID network system of claim 1 wherein the mission sending device comprises a control parameter generator, an instruction generator and a time synchronization generator.

4. A method for operating a radio frequency identification (RFID) network, wherein the RFID network comprises a number plurality of RFID read-write devices for processing electronic RFID labels, and a central controller coupled to the RFID read-write devices via a communication network, the method comprising:
providing a mission message reception device and a first network interface, wherein the mission reception device and first network interface are provided via an RFID system unit, and wherein the RFID system unit includes at least one RFID read-write device;
providing, via the central controller, a second network interface and a mission sending device;
sending, via the second network interface and the mission sending device, a mission; and
receiving, via the mission reception device and first network interface, the sent mission;
wherein the mission includes at least one of: adjustment parameters, a list of parameters with degrees of freedom, and a schedule of times and instructions to process data received from the electronic labels by the RFID read-write devices that form the RFID system unit,
wherein the RFID system unit operates autonomously in a controlled manner as specified by the mission message, and the central controller does not directly trigger each individual action performed by the RFID system unit, and
further wherein each mission includes a start time and a duration of implementation of the mission.

5. The method of claim 4 wherein each mission sending device has a parameter implementation device which communicates with a control parameter generator of the mission sending device.

6. The method of claim 4 wherein each mission reception device comprises an instruction device, which communicates with an instruction generator of the mission sending device.

7. The method of claim 4 wherein each mission reception device comprises a time synchronization unit, which communicates with a time synchronization generator of the mission sending device.

8. The method of claim 4 wherein before an operating interval of the RFID read-write device of the controller, to each RFID system unit, a mission comprising a number of control parameters and/or a number of instructions and/or programs and/or a number of time indications is distributed.

9. The method of claim 8 wherein each mission is implemented by means of time hacks distributed periodically by the controller to the RFID system units independently within a period of time consisting of one or more operational intervals, for processing a number of electronic labels.

10. The method of claim 9 wherein each mission comprises a starting time hack at which each mission should be started.

11. The method of claim 10 wherein the RFID system units assume the starting time hack and with the aid of periodically distributed time hacks all missions of the RFID system units are synchronized, to assist in an interference-free, parallel operation of the RFID read-write devices.

12. The method of claim 8 wherein each mission comprises instructions and/or control parameters for adjusting the RFID system units to query electronic labels.

13. The method of claim 8 wherein each mission comprises time indications for a time at which time each RFID read-write device sends data contents of read electronic labels to the controller.

14. The method of claim 8 wherein each mission comprises an instruction for a sequence of a number of frequency channels or a number of sending and receiving antennas for processing electronic labels and to determines a dwell time.

15. The method of claim 8 wherein each mission contains instructions which trigger independent measurement of mutual interference potential between RFID system units and/or the detection of non-RFID senders.

16. The method of claim 8 wherein each mission comprises instructions and/or programs which determine the data processing of one or more read data contents of electronic labels in the RFID system units.

17. The method of claim 16 wherein each mission comprises instructions and/or programs for processing of data contents of electronic labels for the purpose of a data reduction of repeatedly read data contents or for the purpose of removing data contents read only briefly.

18. The method of claim 16 wherein each mission comprises instructions and/or programs for processing of data contents of electronic labels, for the purpose of storing the processed data contents with or without indicating the frequency channel used by the RFID read-write device and the antenna employed.

19. The method of claim 16 wherein each mission comprises instructions and/or programs for processing the read data contents of electronic labels, for the purpose of comparison with at least one data sample contained in the mission and a guidance is activated of an external signalization element based on the results of comparison.

20. The method of claim 8 wherein each mission comprises an instruction that permits a direct exchange of information between RFID system units found in the communication network, and wherein a number of mobile RFID system units synchronize via an air interface to the time hack, report to an RFID system unit and from it adopt a number of frequency channels and a number of time slots for operation, with it reporting an RFID system unit to the directly adjoining RFID system units and/or to the controller this number of frequency channels and this number of time slots as information for operation.

21. The method of claim 4 wherein tasks of the central controller are implemented redundantly parallel by an additional control processor, for the purpose of increasing reliability and/or for the purpose of compensating load between the controller and the additional controller, to permit scalable growth of the RFID network.

22. A method for operating a radio frequency identification (RFID) network, the method comprising:
    determining adjustment parameters, lists of parameters with degrees of freedom, or schedules of times and instructions to process data received from RFID tags; and,
    providing mission messages to multiple RFID reader devices in the RFID network, wherein the RFID network comprises multiple RFID reader devices for processing the RFID tags;
    wherein a central computer, which is coupled to the RFID reader devices via a communication network, does not directly trigger each individual action performed by the RFID reader devices, but wherein the RFID reader devices each operate autonomously in a controlled manner as specified by received mission messages, and,
    wherein a particular mission message of the received mission messages includes at least one of: adjustment parameters for a particular RFID reader device in the RFID network, a list of parameters with degrees of freedom for a particular RFID reader device in the RFID network, and a schedule of times and instructions to process data received from RFID tags by a particular RFID reader device in the RFID network, and
    further wherein each mission message includes a start time and a duration of implementation of the mission message.

* * * * *